United States Patent
Shen et al.

(10) Patent No.: US 10,093,272 B1
(45) Date of Patent: Oct. 9, 2018

(54) FRONT END ASSEMBLIES HAVING REINFORCEMENT BRACKETS

(71) Applicant: Toyota Motor Engineering & Manufacturing North America, Inc., Erlanger, KY (US)

(72) Inventors: Mingher F. Shen, Ann Arbor, MI (US); Jonathan J. Sander, Greenville, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/620,289

(22) Filed: Jun. 12, 2017

(51) Int. Cl.
*B60R 21/34* (2011.01)
*B60Q 1/04* (2006.01)
*B60R 19/26* (2006.01)
*B60R 21/00* (2006.01)

(52) U.S. Cl.
CPC ............ *B60R 21/34* (2013.01); *B60Q 1/0408* (2013.01); *B60Q 1/0491* (2013.01); *B60R 19/26* (2013.01); *B60Q 1/0433* (2013.01); *B60R 2019/262* (2013.01); *B60R 2021/0004* (2013.01); *B60R 2021/0053* (2013.01); *B60R 2021/343* (2013.01)

(58) Field of Classification Search
CPC ....... B60R 21/34; B60R 19/26; B60Q 1/0408; B60Q 1/0491
USPC .................. 296/187.09, 187.1; 293/102, 117
See application file for complete search history.

(56) References Cited

U.S. PATENT DOCUMENTS

| | | | |
|---|---|---|---|
| 6,357,821 B1 * | 3/2002 | Maj ...................... | B60Q 1/0035 296/193.09 |
| 8,814,394 B2 | 8/2014 | Aquilina et al. | |
| 9,174,568 B2 | 11/2015 | Nemoto | |
| 9,205,803 B2 | 12/2015 | Farooq et al. | |
| 2010/0214801 A1 * | 8/2010 | Yonezawa ............ | B60Q 1/0491 362/549 |

FOREIGN PATENT DOCUMENTS

| | | |
|---|---|---|
| CN | 203805827 U | 9/2014 |
| DE | 102004024987 B4 | 8/2008 |
| DE | 102005045684 B4 | 6/2011 |
| KR | 20080084134 A | 9/2008 |

* cited by examiner

*Primary Examiner* — Joseph D. Pape
(74) *Attorney, Agent, or Firm* — Dinsmore & Shohl LLP

(57) ABSTRACT

A vehicle includes a headlamp assembly, an upper bumper assembly, and a reinforcement bracket. The headlamp assembly includes a headlamp housing and a brace portion. The brace portion includes a front end that extends forward beyond the headlamp housing in the vehicle-longitudinal direction. The upper bumper assembly extends in a vehicle-lateral direction. The upper bumper assembly is positioned forward in the vehicle longitudinal direction with respect to the brace portion. The reinforcement bracket is attached to the brace portion. The reinforcement bracket has a rigidity higher than a rigidity of the brace portion. The reinforcement bracket reinforces the brace portion upon engagement with the upper bumper assembly as the upper bumper assembly deflects rearward in the vehicle-longitudinal direction in response to a front impact to the upper bumper assembly to inhibit movement of the upper bumper assembly rearward in the vehicle-longitudinal direction.

20 Claims, 9 Drawing Sheets

US 10,093,272 B1

FRONT END ASSEMBLIES HAVING REINFORCEMENT BRACKETS

TECHNICAL FIELD

The present specification generally relates to front end assemblies for vehicles and, more specifically, to front end assemblies for vehicles having reinforcement brackets to reinforce against movement of a bumper assembly rearward in a vehicle-longitudinal direction in response to a front impact in the vehicle-longitudinal direction.

BACKGROUND

Vehicles may be equipped with bumper assemblies and impact protection structures that elastically and plastically deform to absorb energy in the event of an impact. A number of standards and tests for evaluating such assemblies currently exist. For example, methods have been developed to assess the protection of an adult pedestrian by simulating leg-impact conditions during a car-to-pedestrian impact. Generally, under some leg impact testing conditions, a bumper assembly that more evenly distributes forces in a vehicle-vertical direction can reduce a bending moment on a leg impactor. Reducing such a bending moment can improve leg impact test results.

Accordingly, there is a need for a front end assembly of a vehicle capable of evenly distributes forces in to vehicle-vertical direction to increase a reduction of a bending moment on the leg impactor.

SUMMARY

In accordance with one embodiment, a vehicle is provided. The vehicle includes a headlamp assembly, an upper bumper assembly, and a reinforcement bracket. The headlamp assembly includes a headlamp housing and a brace portion. The brace portion includes a front end that extends forward beyond the headlamp housing in the vehicle-longitudinal direction. The upper bumper assembly extends in a vehicle-lateral direction. The upper bumper assembly is positioned forward in the vehicle longitudinal direction with respect to the brace portion. The reinforcement bracket is attached to the brace portion. The reinforcement bracket has a rigidity higher than a rigidity of the brace portion. The reinforcement bracket reinforces the brace portion upon engagement with the upper bumper assembly as the upper bumper assembly deflects rearward in the vehicle-longitudinal direction in response to a front impact to the upper bumper assembly to inhibit movement of the upper bumper assembly rearward in the vehicle-longitudinal direction.

In accordance with another embodiment, a front end assembly is provided. The front end assembly includes a headlamp assembly, an upper bumper assembly, and a reinforcement bracket. The headlamp assembly includes a headlamp housing and a brace portion. The brace portion includes a front end that extends forward beyond the headlamp housing in the vehicle-longitudinal direction. The upper bumper assembly extends in a vehicle-lateral direction. The upper bumper assembly is positioned forward in the vehicle longitudinal direction with respect to the brace portion. The reinforcement bracket is attached to the brace portion. The reinforcement bracket has a rigidity higher than a rigidity of the brace portion. The reinforcement bracket reinforces the brace portion upon engagement with the upper bumper assembly as the upper bumper assembly deflects rearward in the vehicle-longitudinal direction in response to a front impact to the upper bumper assembly to inhibit movement of the upper bumper assembly rearward in the vehicle-longitudinal direction.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a front end assembly that includes a headlamp assembly, an upper bumper assembly, and a reinforcement bracket. The headlamp assembly includes a headlamp housing and a brace portion. The brace portion braces the upper bumper assembly against deflection rearward in the vehicle-longitudinal direction in response to a front impact to the upper bumper assembly to inhibit movement of the upper bumper assembly rearward in the vehicle-longitudinal direction. The reinforcement bracket reinforces the brace portion of the headlamp assembly to further inhibit movement of the upper bumper assembly rearward in the vehicle-longitudinal direction in response to a front impact to the upper bumper assembly. Such a reinforcement using the reinforcement bracket can provide a more even distribution of impact forces under leg impact test conditions.

In the embodiments described herein, the phrase "vehicle-longitudinal direction" refers to the forward-rearward direction (i.e., the +/−x direction of the coordinate axes in the figures). The phrase "vehicle-vertical direction" refers to the upward-downward direction (i.e., the +/−z direction of the coordinate axes in the figures). The phrase "vehicle-lateral direction" refers to the left-right direction (i.e., the +/−y direction of the coordinate axes in the figures). Further, the terms "inboard" and "outboard" are used to describe the relative positioning of various components of the vehicle with respect to a centerline of the vehicle. As used herein, the term "front impact" refers to the impact that results when an object collides with the front end of a vehicle, possibly resulting in the deformation or translation of bumper assembly components with respect to the vehicle and damage or injury to the object.

Motor vehicles that incorporate elements according to the present disclosure may include a variety of construction methodologies that are conventionally known, including the unibody construction methodology as well as a body-on-frame construction methodology.

Figure 1:
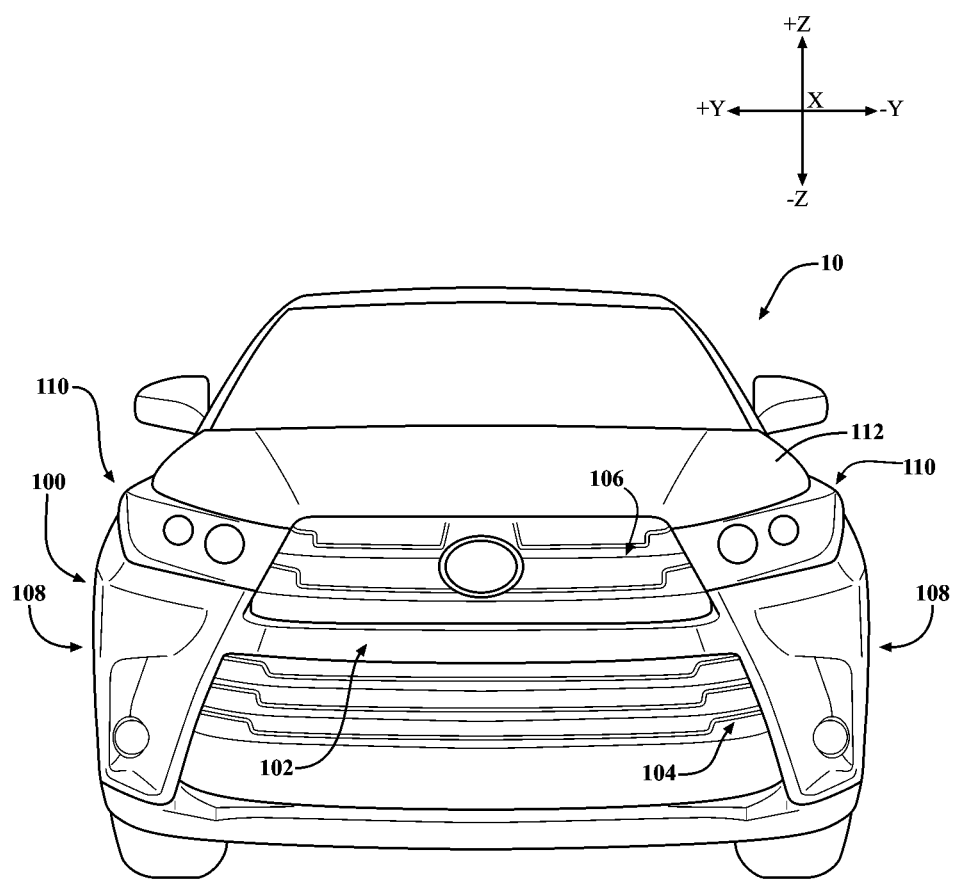
FIG. 1 depicts a front view of a vehicle with a bumper assembly positioned at the front of the vehicle, according to one or more embodiments shown and described herein.

Referring to FIG. 1, a vehicle 10 includes a front end assembly 100. The front end assembly 100 includes an upper bumper cover portion 102 that extends in a vehicle-lateral direction of the vehicle 10. The front end assembly 100 may further include a lower grille assembly 104 and an upper grille assembly 106 with the upper bumper cover portion 102 disposed therebetween. The vehicle 10 may also include front fenders 108 disposed at opposite sides of the upper grille assembly 106 and the lower grille assembly 104 with headlamp assemblies 110. A hood 112 may be located above the upper grille assembly 106 that provides a cover for an engine compartment.

Figure 2:
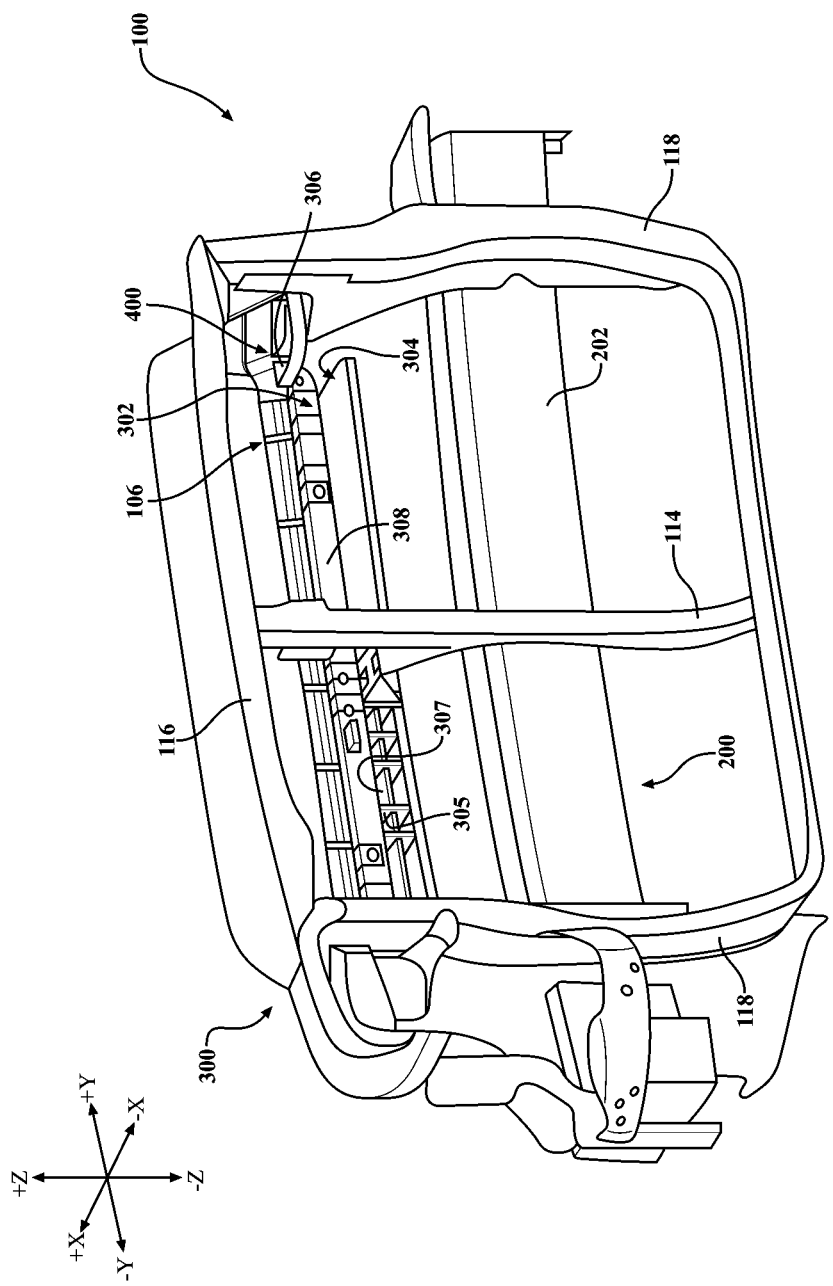
FIG. 2 depicts a rear perspective view of the bumper assembly of the bumper assembly of FIG. 1 with a front fascia and headlamp assemblies removed, according to one or more embodiments shown and described herein.

Referring to FIG. 2, embodiments of the front end assembly 100 may further include a bumper assembly 200 that includes a bumper reinforcement beam 202. The bumper reinforcement beam 202 may be connected to side members and extends in a vehicle-lateral direction. The front end assembly 100 may further includes a radiator support beam 114, a cross support beam 116, and side support beams 118. The radiator support beam 114 may couple an upper bumper assembly 300 with the bumper assembly 200, and extends generally in the vehicle-vertical direction. In some embodiments, the radiator support beam 114 may be coupled to the lower grille assembly 104 and the upper grille assembly 106. The bumper reinforcement beam 202 may be constructed from steel, carbon fiber, plastic or combinations thereof.

The front end assembly 100 further includes an upper bumper assembly 300 located above the bumper reinforcement beam 202 in the vehicle-vertical direction. The upper bumper assembly 300 may be coupled to the radiator support beam 114 and/or the upper bumper cover portion 102. In some embodiments, the upper bumper assembly 300 may extend substantially the entire width of the upper bumper cover portion 102. In some embodiments, the upper bumper assembly 300 may extend a portion of the width of the front end assembly 100, for example 50%, 75%, 80%, 90%, 110%, 120% or more of the width of the upper bumper cover portion 102.

The upper bumper assembly 300 may include a bumper cover retainer 302 and a retainer support structure 304. In some embodiments, the bumper cover retainer 302 has a rigidity higher than a rigidity of the retainer support structure 304. In some embodiments, the retainer support structure 304 is rearward of the upper bumper cover portion 102 such that deflection of the upper bumper cover portion 102 during front impact causes the upper bumper cover portion 102 to contact the retainer support structure 304. The retainer support structure 304 may include vertical walls 305 and horizontal walls 307 forming a somewhat honeycomb structure. The vertical walls 305 and horizontal walls 307 may increase the strength of the retainer support structure 304 in the vehicle-longitudinal direction. The retainer support structure 304 can support the upper bumper cover portion 102 and reduces or eliminates deflection of the upper bumper cover portion 102 under certain front impacts. The vertical walls 305 and horizontal walls 307 may be formed from plastic and have a high strength to weight ratio such that the retainer support structure 304 deflects little during a front impact but does not add substantially to the overall weight of the vehicle 10.

In some embodiments, the bumper cover retainer 302 is located rearward of the retainer support structure 304. The bumper cover retainer 302 may be positioned such that rearward motion of the upper bumper cover portion 102 is retained and/or reduced. The bumper cover retainer 302 may be coupled to the upper bumper cover portion 102 through one or more holes (not shown) through the bumper cover retainer 302.

Figure 3:
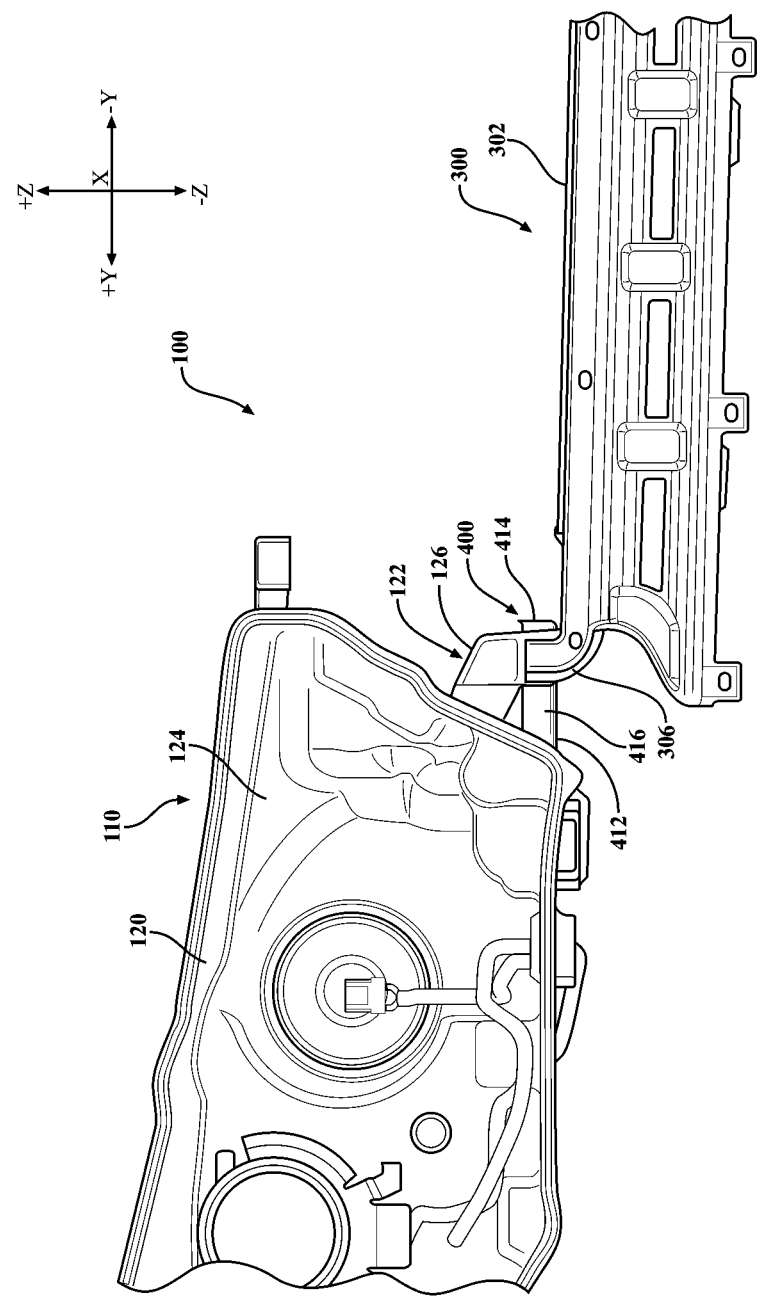
FIG. 3 depicts a schematic front view of a bumper cover retainer, headlamp assembly, and reinforcement bracket of the bumper assembly of FIG. 1, according to one or more embodiments shown and described herein.
Figure 4:
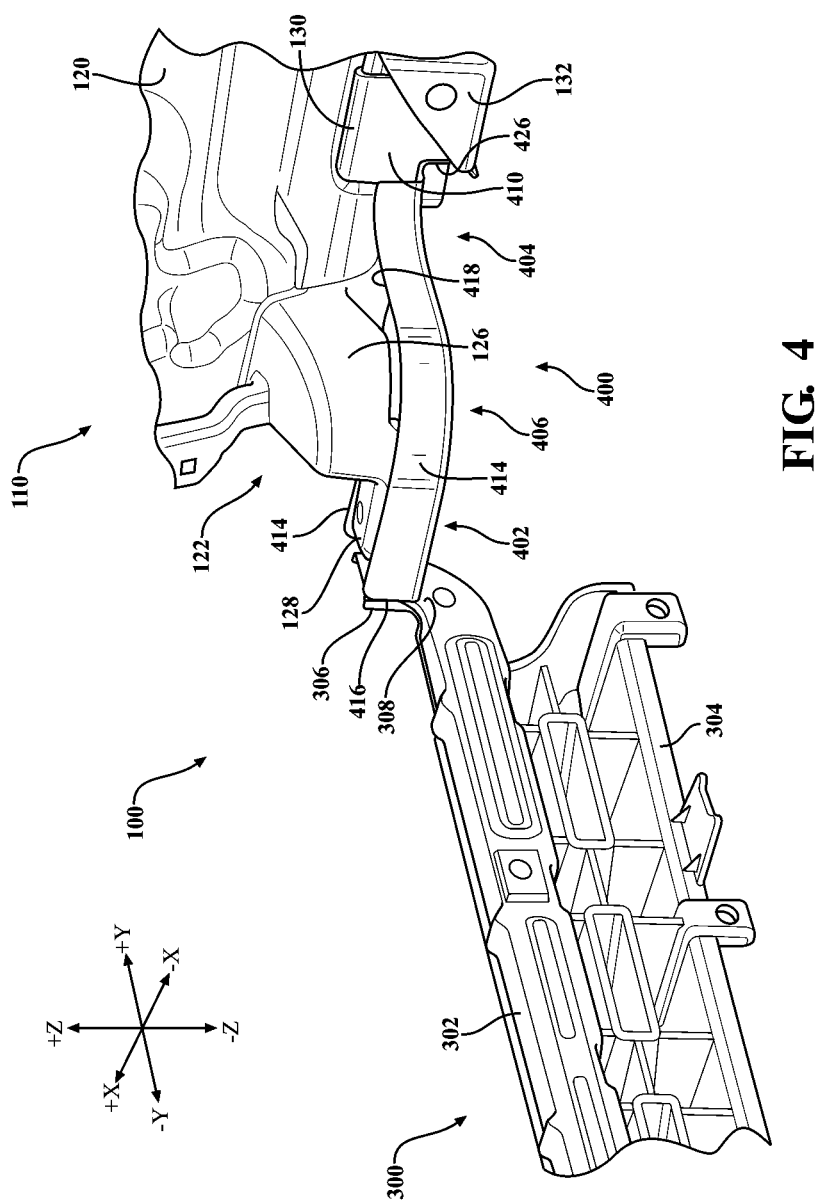
FIG. 4 depicts a schematic rear perspective view of the bumper cover retainer, headlamp assembly, and reinforcement bracket of the bumper assembly of FIG. 1, according to one or more embodiments shown and described herein.

FIGS. 3 and 4 illustrates the relative placement of the upper bumper assembly 300 with the headlamp assembly 110 of the front end assembly 100. The bumper cover retainer 302 includes end portions 306. In some embodiments, the end portions 306 may extend upwardly in the vehicle-vertical direction. The end portions 306 include rear surfaces 308 that face rearward in the vehicle-longitudinal direction.

The headlamp assembly 110 includes a headlamp housing 120 and a brace portion 122. The headlamp housing 120 defines a cavity 124 configured to receive a lamp unit and a lens (not shown). The brace portion 122 extends outwardly from the headlamp housing 120. The brace portion 122 includes an arm portion 126 and a reinforcement portion 128. The arm portion 126 extends between the headlamp housing 120 and the reinforcement portion 128. The reinforcement portion 128 extends forward in a vehicle-longitudinal direction beyond the arm portion 126 and the headlamp housing 120.

Figure 5:
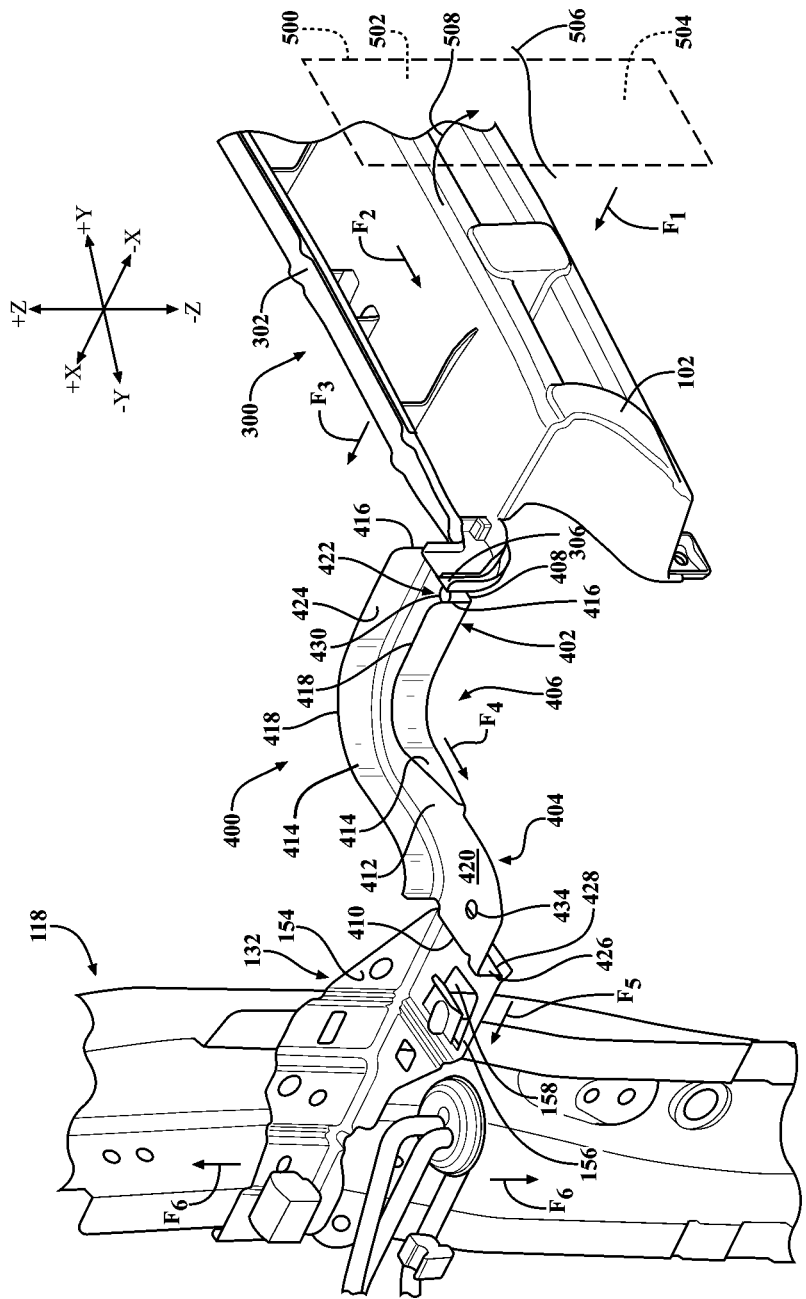
FIG. 5 depicts a detail front perspective view of bumper cover retainer and reinforcement bracket of the bumper assembly of FIG. 1, according to one or more embodiments shown and described herein.

As shown in FIG. 4, the headlamp housing 120 includes a connection portion 130 that is positioned rearward, in the vehicle-longitudinal direction, of the brace portion 122. As shown in FIGS. 4 and 5, the connection portion 130 that connects to a mounting bracket 132 forming a portion of the side support beam 118.

In some embodiments, the headlamp housing 120, and the arm portion 126 and the reinforcement portion 128 of the brace portion 122 are integrally formed as a one-piece monolithic structure. Specifically, the brace portion 122 may be molded integrally with the headlamp housing 120 so that the headlamp housing 120 and the arm portion 126 and the reinforcement portion 128 of the brace portion 122 are a single one-piece monolithic structure. The headlamp housing 120 and the brace portion 122, including the arm portion 126 and the reinforcement portion 128, are formed of a plastic material.

In some other embodiments, the headlamp housing 120, the arm portion 126 and the reinforcement portion 128 of the brace portion 122, and the connection portion 130 are integrally formed as a one-piece monolithic structure. Specifically, the brace portion 122 may be molded integrally with the headlamp housing 120 so that the headlamp housing 120, the arm portion 126 and the reinforcement portion 128 of the brace portion 122, and the connection portion 130 are a single one-piece monolithic structure. The headlamp housing 120, the brace portion 122, including the arm portion 126 and the reinforcement portion 128, and the connection portion 130 are formed of a plastic material.

Referring to FIGS. 3-5, the front end assembly 100 further includes a reinforcement bracket 400. The reinforcement bracket 400 is formed having a rigidity higher than the rigidity of the brace portion 122 and/or the headlamp assembly 110. In some embodiments, the reinforcement bracket 400 is formed of a metallic material which has a rigidity higher than a rigidity of the brace portion 122 and/or the headlamp assembly 110. As will be described in greater detail below, the reinforcement bracket 400 is attached to the brace portion 122 to reinforce the brace portion 122 which engages with the upper bumper assembly 300 as the upper bumper assembly 300 deflects rearward in the vehicle-longitudinal direction in response to a front impact to the upper bumper assembly 300 to inhibit movement of the upper bumper assembly 300 rearward in the vehicle-longitudinal direction.

The reinforcement bracket 400 includes a first portion 402, a second portion 404, and a traversing portion 406 connecting the first portion 402 to the second portion 404. The first portion 402 and the second portion 404 may extend generally parallel. The traversing portion 406 extends generally between the first portion 402 and the second portion 404. The traversing portion 406 may extend generally normal to the first portion 402 and the second portion 404.

In some other embodiments, the first portion 402 and the second portion 404 may extend generally parallel to the vehicle-longitudinal direction and the traversing portion 406 may extend generally parallel to the vehicle-lateral direction.

The first portion 402 is forward of both the traversing portion 406 and the second portion 404. The second portion 404 is rearward of both the traversing portion 406 and the first portion 402. In some embodiments, the reinforcement bracket 400 is integrally formed as a one-piece monolithic structure, specifically, the first portion 402, the second portion 404, and the traversing portion 406 of the reinforcement bracket 400 are integrally formed as a one-piece monolithic.

In some other embodiments, the reinforcement bracket 400 may be molded integrally with the headlamp assembly 110 so that the reinforcement bracket 400 and the reinforcement portion 128 of the brace portion 122 are a single one-piece monolithic structure. Specifically, the headlamp assembly 110 and the reinforcement bracket 400 may be molded integrally using a multi-material injection molding process. The headlamp assembly 110, including the headlamp housing 120, the arm portion 126 and the reinforcement portion 128 of the brace portion 122 are molded from a first material and the reinforcement bracket 400 is molded from a second material. The second material having a rigidity higher than a rigidity of the first material.

The first portion 402 includes a front end 408 of the reinforcement bracket 400. The front end 408 is a forward most portion, in the vehicle-longitudinal direction, of the reinforcement bracket 400. The second portion 404 includes a rear end 410 of the reinforcement bracket 400. The rear end is a rearward most portion, in the vehicle-longitudinal direction, of the reinforcement bracket 400.

The reinforcement bracket 400 includes a bottom wall 412 that extends from the front end 408 to the rear end 410 of the reinforcement bracket 400. Specifically, the bottom wall 412 extends in the vehicle-longitudinal direction through the first portion 402. The bottom wall 412 bends generally 90°±5° in a first direction to extend in the vehicle-lateral direction through the traversing portion 406. The bottom wall 412 bends generally 90°±5° in a second direction different from the first direction to extend in the vehicle-longitudinal direction through the second portion 404.

The reinforcement bracket 400 may include a pair of sidewalls 414 that extend upwardly in the vehicle-vertical direction from each side of the bottom wall 412. Each of the pair of sidewalls 414 includes a front edge 416 that extends flush with the front end 408.

The pair of sidewalls 414 include an upper edge 418 that is spaced apart from an upper surface 420 of the bottom wall 412. As will be described in greater detail below, the bottom wall 412 and the pair of sidewalls 414 have a generally U-shaped cross-sectional shape that defines a cavity 422. Specifically, the upper surface 420 of the bottom wall 412 and interior surfaces 424 of the sidewalls 414 form the cavity 422.

The pair of sidewalls 414 extend continuously along a portion of the bottom wall 412. Specifically, the pair of sidewalls 414 extend from the front edges 416, located at the front end 408, along the first portion 402. In some embodiments, the sidewalls 414 extend partially along the first portion 402, the traversing portion 406, and the second portion 404. In some other embodiments, the sidewalls 414 extend partially along the first portion 402 and the traversing portion 406.

The reinforcement bracket 400 may include a flange 426 that extends downwardly from the rear end 410 of the reinforcement bracket 400 in the vehicle-vertical direction. The flange 426 extends the width of the bottom wall 412 in the vehicle-lateral direction. The flange 426 includes a distal end 428 that is a lowermost portion of the flange 426 in the vehicle-vertical direction.

Figure 7:
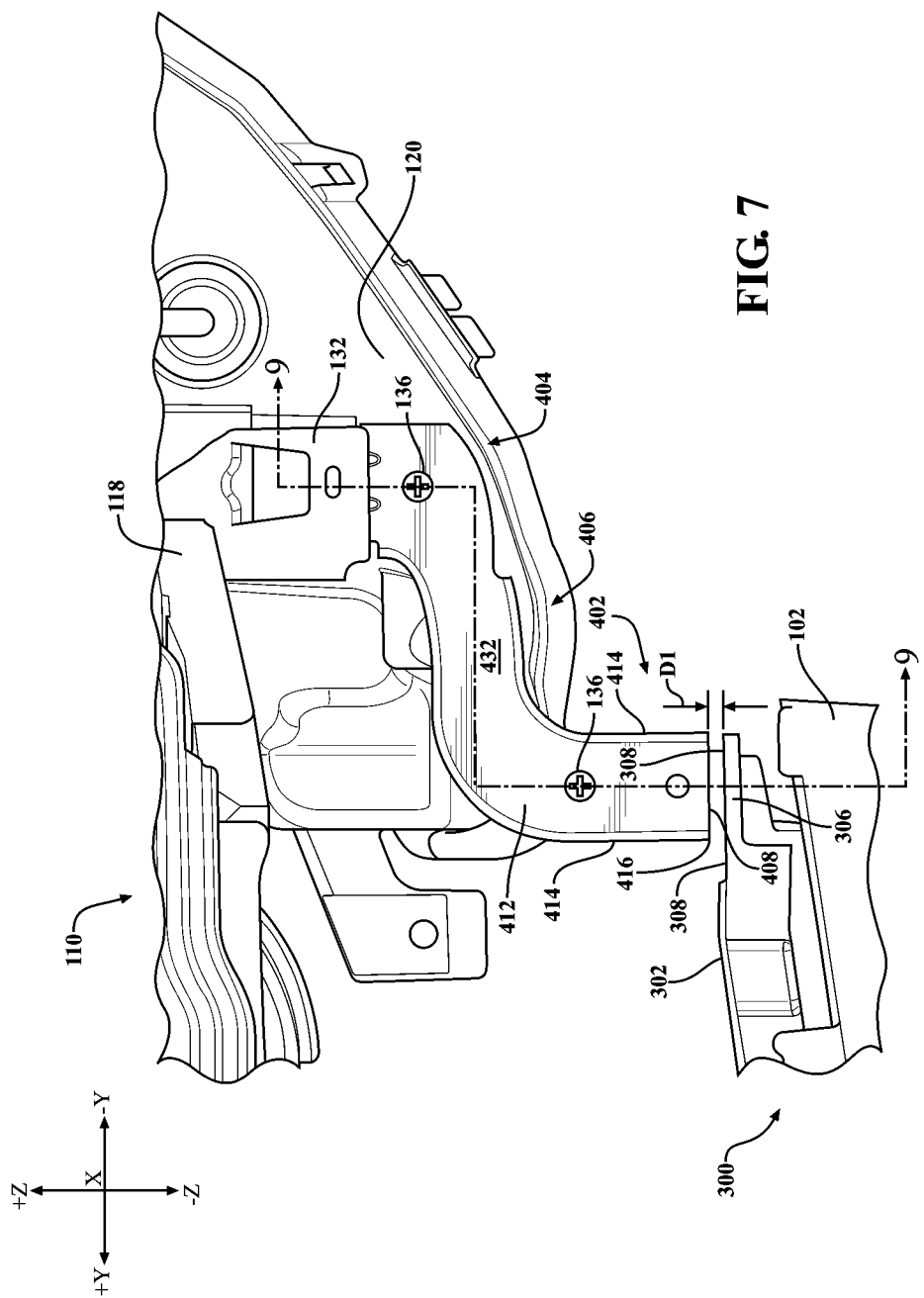
FIG. 7 depicts a detail bottom view of the bumper cover retainer, headlamp assembly, and reinforcement bracket of the bumper assembly of FIG. 1, according to one or more embodiments shown and described herein.

Referring to FIGS. 5 and 7, a first aperture 430 is formed in the bottom wall 412 of the first portion 402. The first aperture 430 extends between the upper surface 420 and an opposite lower surface 432 of the bottom wall 412. A second aperture 434 is formed in the bottom wall 412 of the second portion 404. The second aperture 434 extends between the upper surface 420 and the lower surface 432 of the bottom wall 412.

Figure 6:
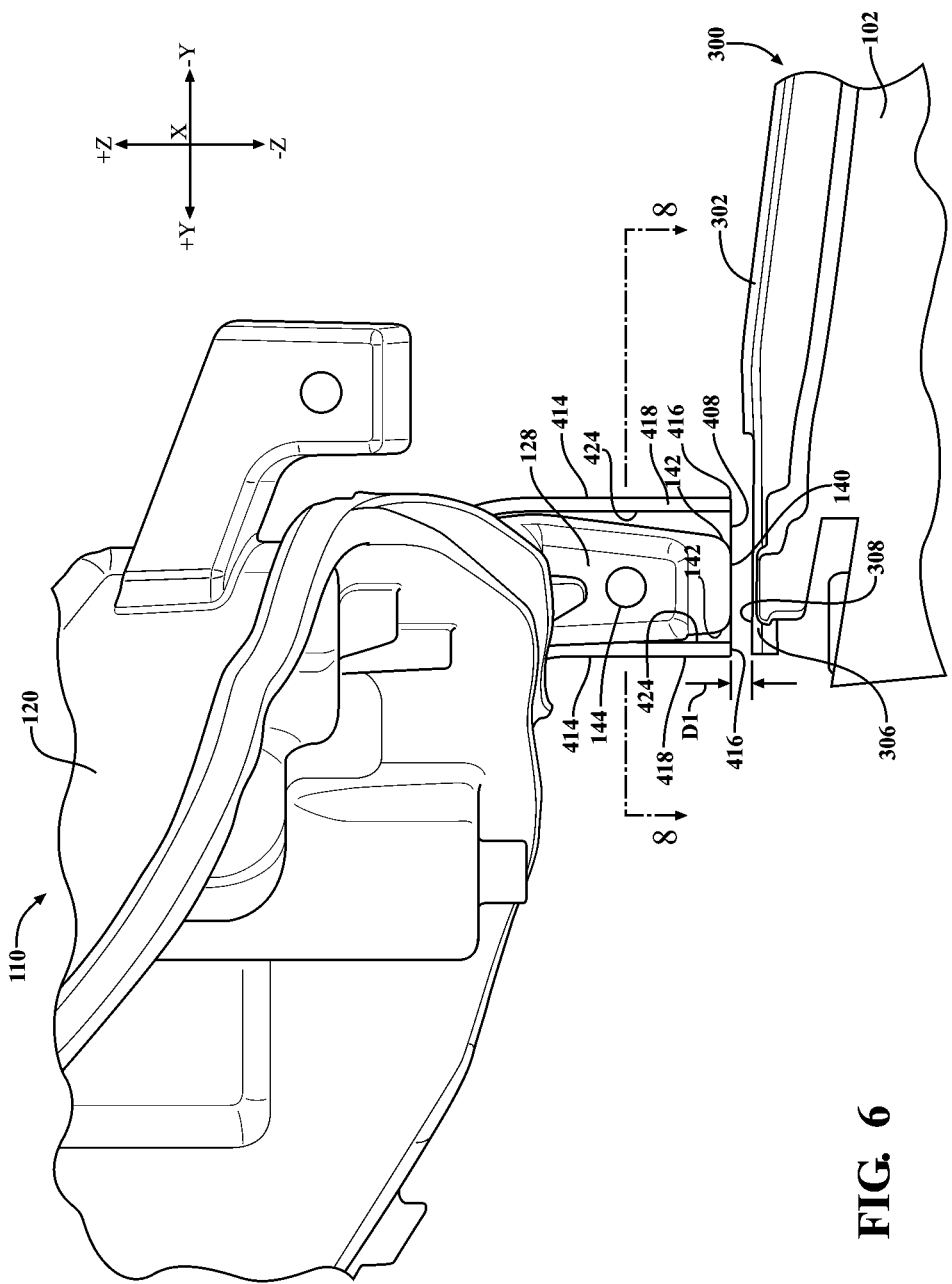
FIG. 6 depicts a detail top view of bumper cover retainer, headlamp assembly, and reinforcement bracket of the bumper assembly of FIG. 1, according to one or more embodiments shown and described herein.

Referring to FIG. 6, the reinforcement portion 128 includes a distal end 140 that is a forward most portion of the brace portion 122 in the vehicle-longitudinal direction. The distal end 140 of the reinforcement portion 128 extends forward beyond the headlamp housing 120 in the vehicle-longitudinal direction. The reinforcement portion 128 includes sides 142 that extend rearwardly from the distal end 140 in the vehicle-longitudinal direction. The sides 142 are tapered extending forward towards the distal end 140, in the vehicle-longitudinal direction, so as to narrow a width of the reinforcement portion 128, in the vehicle-lateral direction.

Figure 8:
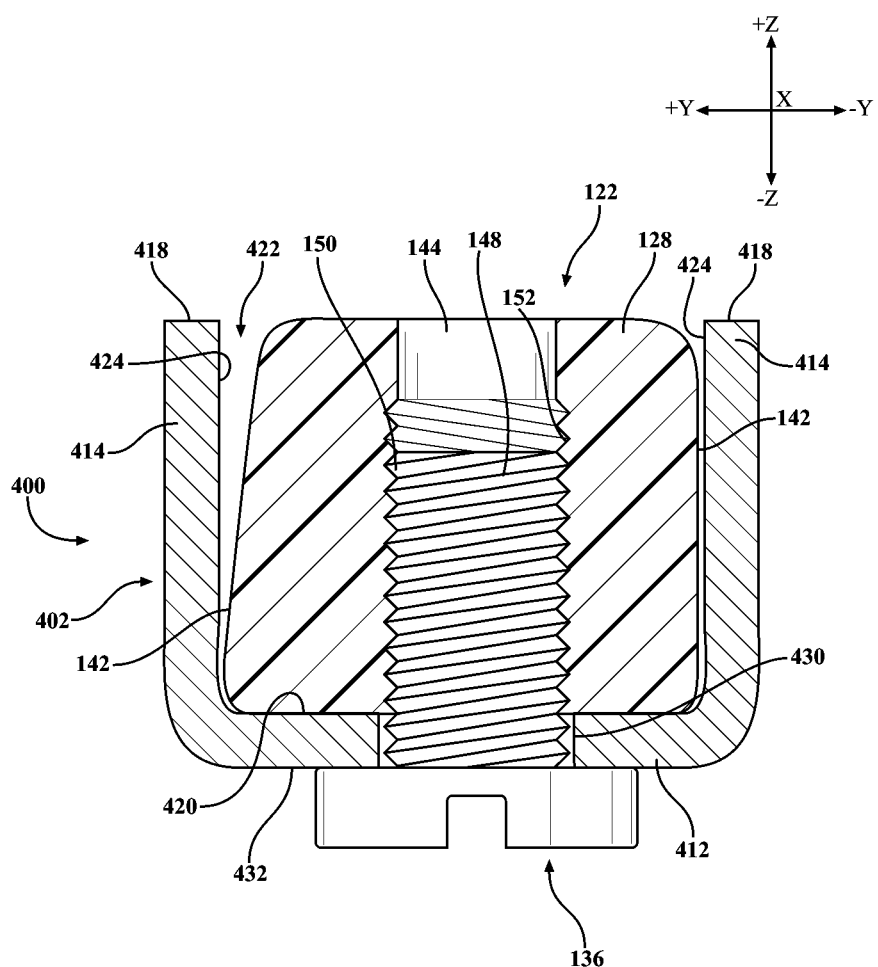
FIG. 8 depicts a partial schematic cross sectional front view of the headlamp assembly and the reinforcement bracket taken along the line 8-8 of FIG. 6.
Figure 9:
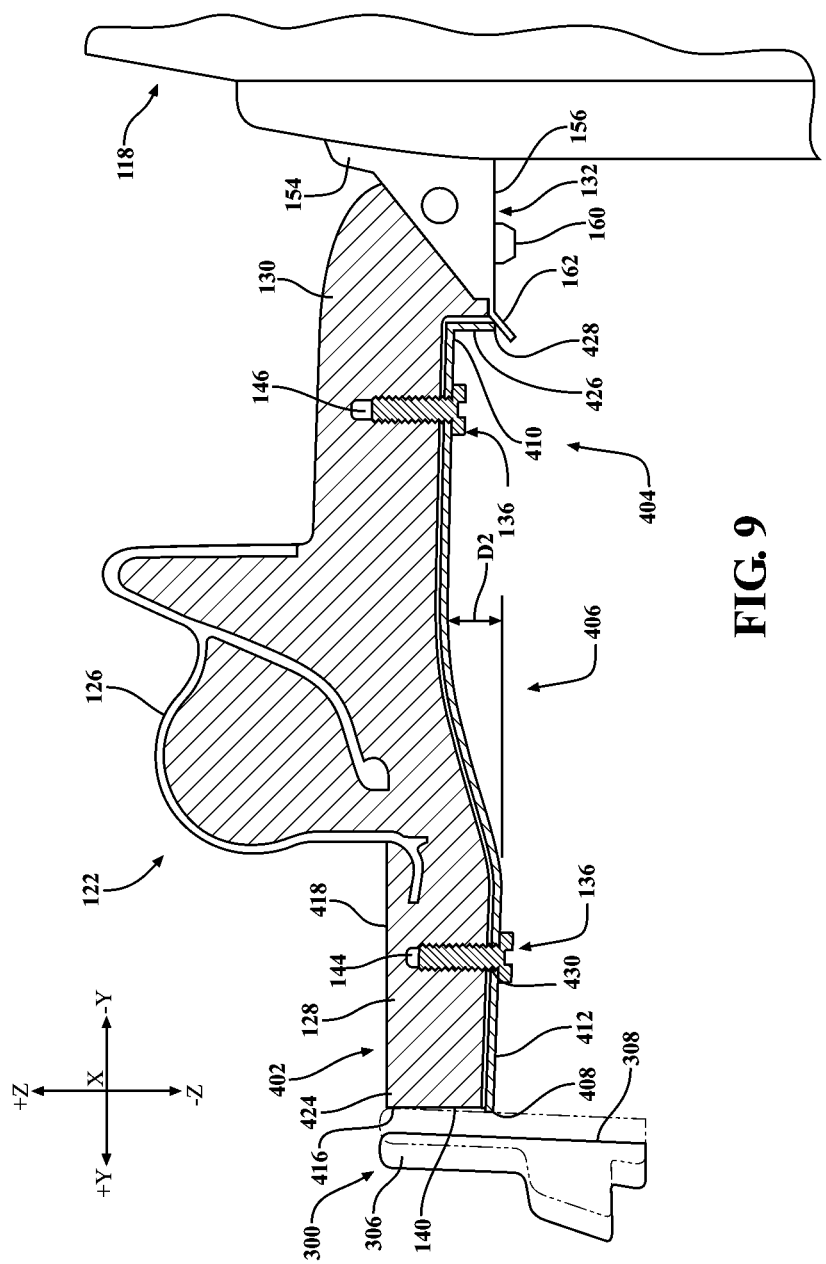
FIG. 9 depicts a partial schematic cross sectional side view of the bumper cover retainer, the headlamp assembly and the reinforcement bracket taken along the line 9-9 of FIG. 7.

Referring to FIGS. 6 and 8-9, the reinforcement portion 128 is at least partially received within the cavity 422 formed by the upper surface 420 of the bottom wall 412 and interior surfaces 424 of the sidewalls 414.

The distal end 140 of the reinforcement portion 128 extends flush with the front end 408 and the front edges 416 of the reinforcement bracket 400. The distal end 140, the front end 408, and the front edges 416 are spaced apart a distance D1 from the rear surface 308 of the end portions 306 of the bumper cover retainer 302.

With reference to FIG. 8, the reinforcement portion 128 is received within the cavity 422 such that the sides 142 are positioned between the interior surfaces 424 of the sidewalls 414 of the reinforcement bracket 400. In some other embodiments, the sidewalls 414 of the reinforcement portion 128 are positioned so as to contact the interior surfaces 424 of the sidewalls 414 upon attachment of the reinforcement bracket 400 to the brace portion 122.

With reference to FIGS. 8 and 9, the attachment of the reinforcement bracket 400 to the reinforcement portion 128 will now be discussed. The reinforcement portion 128 of the brace portion 122 includes a first bore 144, as shown in FIGS. 8 and 9. The connection portion 130 of the headlamp housing 120 includes a second bore 146, as shown in FIG. 9. The first bore 144 is positioned to correspond to the first aperture 430 on the first portion 402 of the reinforcement bracket 400. The second bore 146 is positioned to correspond to the second aperture 434 on the second portion 404 of the reinforcement bracket 400.

The reinforcement bracket 400 is secured to the reinforcement portion 128 by screws 136 or other fasteners. Specifically, a screw 136 is inserted into the first aperture 430 and enters the first bore 144 to secure the first portion 402 of the reinforcement bracket 400 to the reinforcement portion 128 of the brace portion 122. Similarly, a screw 136 is inserted into the second aperture 434 and enters the second bore 146 to secure the second portion 404 of the reinforcement bracket 400 to the connection portion 130 of the headlamp housing 120. In some embodiments, the screws 136 include a shaft 148 having external threads 150 that engage within the first bore 144 and the second bore 146. In some other embodiments, the first bore 144 and the second bore 146 include internal threads 152 that engage with the external threads 150 on the shaft 148 of the screws 136.

As shown in FIG. 9, the lower surface 432 of the first portion 402 is spaced apart a distance D2 from the lower surface 432 of the second portion 404. Specifically, the lower surface 432 adjacent the front end 408 is lower by the distance D2, in the vehicle-vertical direction, than the lower surface 432 adjacent the rear end 410.

With reference to FIGS. 5 and 9, the mounting bracket 132, which forms a portion of the side support beam 118, includes a connection wall 154. The connection wall 154 connects to the side support beam 118. A platform 156 extends outwardly in the vehicle-lateral direction from the connection wall 154. The platform 156 includes an aperture 158. The connection portion 130 of the headlamp housing 120 includes a downwardly extending tab 160 that engages within the aperture 158 of the platform 156. A contact wall 162 extends at an angle from the platform 156. The contact wall 162 extends forwardly, in the vehicle-longitudinal direction, and downwardly, in the vehicle-vertical direction, from the platform 156. In some embodiments, the contact wall 162 extends at an oblique angle from the platform 156.

As shown in FIG. 9, the flange 426 of the second portion 404 of the reinforcement bracket 400 contacts the contact wall 162. In some embodiments, the flange 426 is in abutting contact with the contact wall 162. In other embodiments, the flange 426 is fixedly secured to the contact wall 162, such as by welding.

The connection of the headlamp housing 120 to the mounting bracket 132 of the side support beam 118 allows impact forces acting on the headlamp housing 120, in response to a front impact to the upper bumper assembly 300, to be transferred to the side support beam 118. Specifically, impact forces due to the contact between the rear surface 308 and the distal end 140, due to the rearward deflection of the rear surface 308 of the end portion 306 of the bumper cover retainer 302, in the vehicle-longitudinal direction, in response to the front impact to the upper bumper assembly 300 are transferred from the brace portion 122 through the headlamp housing 120 and the connection portion 130 to the side support beam 118 via the mounting bracket 132. The transfer of the impact forces through the headlamp assembly to the side support beam 118 inhibits movement of the upper bumper assembly rearward 300 in the vehicle-longitudinal direction.

The connection of the reinforcement bracket 400 to the mounting bracket 132 of the side support beam 118 allows the reinforcement bracket 400 to reinforce the headlamp housing 120 and the brace portion 122 against impact forces acting on the headlamp housing 120 in response to the front impact to the upper bumper assembly 300. Specifically, the impact forces due to the contact between the rear surface 308 and the front end 408, due to the rearward deflection of the rear surface 308 of the end portion 306 of the bumper cover retainer 302, in the vehicle-longitudinal direction, are shared between the distal end 140 of the brace portion 122 and the front end 408 of the reinforcement bracket 400. As such, at least a portion of the impact forces due to the due to the rearward deflection of the upper bumper assembly 300 is transferred along the reinforcement bracket 400. Specifically, at least a portion of the impact forces are received by the front end 408 and transferred through the first portion 402, the traversing portion 406, and the second portion 404. The transferred impact forces are then transferred from the reinforcement bracket 400 to the side support beam 118 due the contact between the flange 426 and the contact wall 162.

As the reinforcement bracket 400 reinforces the headlamp housing 120 and the brace portion 122 rearward movement of the upper bumper assembly, in the vehicle-longitudinal direction, is inhibited.

In operation, as shown in FIG. 5, as a leg impact assembly 500 comes into contact with the upper bumper cover portion 102. The upper bumper cover portion 102 may deflect the upper bumper assembly 300 rearward, in the vehicle-longitudinal direction, a distance at least equal to the distance D1 such that the rear surface 308 of the end portion 306 of the bumper cover retainer 302 contacts the distal end 140 of the reinforcement portion 128 and the front end 408 of the reinforcement bracket 400. The reinforcement bracket 400 will reinforce the brace portion 122 as the reinforcement bracket 400 is formed having a rigidity higher than the rigidity of the brace portion 122, and the headlamp housing 120, specifically, the reinforcement bracket 400 is formed of a metallic material and the brace portion 122 and the headlamp housing 120 are formed of a plastic material.

Upon contact with the leg impact assembly 500, an impact force F1 is input onto the upper bumper cover portion 102. The upper bumper cover portion 102 and the upper bumper assembly 300 distribute impact force in the vehicle-lateral direction as shown by impact force F2. The impact force F2 is transfer to the reinforcement portion 128 and the reinforcement bracket 400 due to the rearward deflection, in the vehicle-longitudinal direction, of the end portion 306 such that the rear surface 308 contacts the distal end 140 and the front end 408 of the reinforcement portion 128 and the reinforcement bracket 400, respectively, as shown by impact forces F3. The impact forces F3 are transferred through the first portion 402 to the traversing portion 406, impact forces F4, and transferred through the second portion 404, impact forces F5, to the mounting bracket 132. The mounting bracket 132 transferred the impact forces F5 along the side support beam in the vehicle-vertical direction, as shown by impact forces F6. As such, the reinforcement of the reinforcement portion 128 of the brace portion 122 of the headlamp housing 120 by the reinforcement bracket 400 inhibits additional movement of the upper bumper assembly 300 rearward in the vehicle-longitudinal direction.

Thus, the upper bumper cover portion 102 tends to apply a force against an upper portion 502 of the leg impact assembly 500 in the event of a front impact. This causes a moment 508 around joint 506. This moment 508 around joint 506 may counteract other moments developed on the leg impact assembly 500 by components of the front end assembly 100 that may strike the leg impact assembly 500 at lower points on the leg impact assembly 500, for example on the lower portion 504 of the leg impact assembly 500. Portions of the front end assembly 100 such as the lower grille assembly 104 may impact the leg impact assembly 500 before the upper bumper cover portion 102 because they may be extend from the front end assembly 100 farther than the upper bumper cover portion 102 in certain embodiments. Thus, in such embodiments, a moment will be developed on the leg impact assembly 500 at the point of impact with the lower grille assembly 104. By reinforcing the upper bumper cover portion 102, rearward deflection of the upper bumper cover portion 102 is prevented and the counteracting moment 508 can be created.

The above-described front end assemblies provide a reinforcement bracket that may engage the upper bumper assembly as the upper bumper assembly moves rearward in the vehicle-longitudinal direction during a front impact and reinforces the brace portion of the headlamp housing, which contacts the upper bumper assembly upon rearward deflection of the upper bumper assembly, against further rearward deflection in the vehicle-longitudinal direction. The reinforcement bracket reinforces the headlamp assembly against further movement of the upper bumper assembly rearward, in the vehicle-longitudinal direction, to more evenly distributed, in the vehicle vertical direction, impact force acting on the leg impact assembly. Specifically, by strengthening the rigidity of a load path between the upper bumper assembly, headlamp assembly, and the side support beam, acting as a vehicle frame member, the rearward deflection of the upper bumper assembly is inhibited and/or reduced which more evenly distributes the impact forces upon impact acting on the leg impact assembly 500 in the vehicle vertical direction. The reinforcement bracket may be formed of a material (e.g., metal) that has a higher rigidity (i.e. harder) than the brace portion of the headlamp assembly bumper cover, which can provide increased reinforcement against movement of the upper bumper assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a headlamp assembly having a headlamp housing and a brace portion, the brace portion includes a front end that extends forward beyond the headlamp housing in a vehicle-longitudinal direction;
   an upper bumper assembly that extends in a vehicle-lateral direction, the upper bumper assembly positioned forward in the vehicle longitudinal direction with respect to the brace portion; and
   a reinforcement bracket attached to the brace portion, the reinforcement bracket having a rigidity higher than a rigidity of the brace portion, the reinforcement bracket reinforces the brace portion upon engagement with the upper bumper assembly as the upper bumper assembly deflects rearward in the vehicle-longitudinal direction in response to a front impact to the upper bumper assembly to inhibit movement of the upper bumper assembly rearward in the vehicle-longitudinal direction.

2. The vehicle of claim 1, wherein the brace portion is formed of a plastic material and the reinforcement bracket is formed of a metallic material.

3. The vehicle of claim 1, wherein a front end of the reinforcement bracket in the vehicle-longitudinal direction is spaced apart from a rear surface of the upper bumper assembly.

4. The vehicle of claim 1, wherein the reinforcement bracket includes a bottom wall and a pair of sidewalls extending upwardly in a vehicle-vertical direction from the bottom wall to define a cavity, and wherein a portion of the brace portion is received within the cavity between interior surfaces of the pair of sidewalls.

5. The vehicle of claim 1, wherein the brace portion is integrally molded with the headlamp housing as a one-piece monolithic structure.

6. The vehicle of claim 1, wherein the reinforcement bracket includes a first portion, a second portion, and a traversing portion connecting the first portion and the second portion.

7. The vehicle of claim 6, wherein the first portion includes the front end of the reinforcement bracket and the second portion includes a rear end of the reinforcement bracket.

8. The vehicle of claim 7, wherein the first portion and the second portion are secured to the brace portion by fasteners.

9. The vehicle of claim 7 further comprising a side support beam,
   wherein the rear end of the reinforcement bracket contacts the side support beam in response to the front impact to the upper bumper assembly to inhibit movement of the upper bumper assembly rearward in the vehicle-longitudinal direction.

10. The vehicle of claim 7 further comprising a side support beam,
    wherein the rear end of the reinforcement bracket includes a flange that extends downwardly in the vehicle-vertical direction, the flange contacts the side support beam in response to the front impact to the upper bumper assembly to inhibit movement of the upper bumper assembly rearward in the vehicle-longitudinal direction.

11. A front end assembly for a vehicle, the front end assembly comprising:
    a headlamp assembly having a headlamp housing and a brace portion, the brace portion includes a front end that extends forward beyond the headlamp housing in a vehicle-longitudinal direction;

an upper bumper assembly that extends in a vehicle-lateral direction, the upper bumper assembly positioned forward in the vehicle longitudinal direction with respect to the brace portion; and a reinforcement bracket attached to the brace portion, the reinforcement bracket having a rigidity higher than a rigidity of the brace portion, the reinforcement bracket reinforces the brace portion upon engagement with the upper bumper assembly as the upper bumper assembly deflects rearward in the vehicle-longitudinal direction in response to a front impact to the upper bumper assembly to inhibit movement of the upper bumper assembly rearward in the vehicle-longitudinal direction.

12. The front end assembly of claim 11, wherein the brace portion is formed of a plastic material and the reinforcement bracket is formed of a metallic material.

13. The front end assembly of claim 11, wherein a front end of the reinforcement bracket in the vehicle-longitudinal direction is spaced apart from a rear surface of the upper bumper assembly.

14. The front end assembly of claim 11, wherein the reinforcement bracket includes a bottom wall and a pair of sidewalls extending upwardly in a vehicle-vertical direction from the bottom wall to define a cavity, and wherein a portion of the brace portion is received within the cavity between interior surfaces of the pair of sidewalls.

15. The front end assembly of claim 11, wherein the brace portion is integrally molded with the headlamp housing as a one-piece monolithic structure.

16. The front end assembly of claim 11, wherein the reinforcement bracket includes a first portion, a second portion, and a traversing portion connecting the first portion and the second portion.

17. The front end assembly of claim 16, wherein the first portion includes the front end of the reinforcement bracket and the second portion includes a rear end of the reinforcement bracket.

18. The front end assembly of claim 17, wherein the first portion and the second portion are secured to the brace portion by fasteners.

19. The front end assembly of claim 17 further comprising a side support beam, wherein the rear end of the reinforcement bracket contacts the side support beam in response to the front impact to the upper bumper assembly to inhibit movement of the upper bumper assembly rearward in the vehicle-longitudinal direction.

20. The vehicle of claim 17 further comprising a side support beam, wherein the rear end of the reinforcement bracket includes a flange that extends downwardly in the vehicle-vertical direction, the flange contacts the side support beam in response to the front impact to the upper bumper assembly to inhibit movement of the upper bumper assembly rearward in the vehicle-longitudinal direction.

* * * * *